(12) United States Patent
Jaggi (10) Patent No.: US 10,721,376 B2
(45) Date of Patent: Jul. 21, 2020

(54) SYSTEM AND METHOD TO IDENTIFY BACKUP CAMERA VISION IMPAIRMENT (71) Applicant: GM GLOBAL TECHNOLOGY OPERATIONS LLC, Detroit, MI (US)

(72) Inventor: Kunal Jaggi, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 280 days.

(21) Appl. No.: 15/960,685

(22) Filed: Apr. 24, 2018

(65) Prior Publication Data

US 2019/0327391 A1 Oct. 24, 2019

(51) Int. Cl.
*H04N 5/217* (2011.01)
*H04N 7/18* (2006.01)
*G06K 9/00* (2006.01)

(52) U.S. Cl.
CPC ....... *H04N 5/2171* (2013.01); *G06K 9/00805* (2013.01); *H04N 7/188* (2013.01); *B60R 2300/307* (2013.01)

(58) Field of Classification Search
None
See application file for complete search history.

(56) References Cited

U.S. PATENT DOCUMENTS

| 2012/0143430 | A1* | 6/2012 | Broggi | G01S 17/86 701/28 |
|---|---|---|---|---|
| 2014/0200742 | A1 | 7/2014 | Mauti, Jr. | |
| 2016/0075272 | A1 | 3/2016 | Cermak et al. | |

* cited by examiner

*Primary Examiner* — Matthew C Bella
*Assistant Examiner* — Brian D Shin (57) ABSTRACT

A system to identify vision sensor impairment, the system including: a memory with one or more executable instructions; a controller to execute the executable instructions; a vision sensor located on a vehicle to capture at least one image of at least a portion of an environment surrounding the vehicle; where the executable instructions enable the controller to: receive a request communicated from a mobile computing device; in response to the request, communicate an activation signal to the vision sensor, the activation signal to activate the vision sensor to capture an image of the environment surrounding the vehicle; receive the captured image from the vision sensor; determine whether the view of the captured image includes a substantially impairing weather debris object; and based on this determination, generate a notification and communicate the notification to the mobile computing device.

17 Claims, 5 Drawing Sheets

SYSTEM AND METHOD TO IDENTIFY BACKUP CAMERA VISION IMPAIRMENT

INTRODUCTION

A backup camera (reversal camera) is a video camera attached to the rear of a vehicle to aid in backing up and to alleviate the vehicle's rear blind spot. As such, backup cameras aid to avoid a backup collision. However, their assistance becomes limited when weather debris and road debris incidentally builds on the camera lens. It is therefore desirable to provide a system and method which notifies the vehicle operator to clear debris off the lens of the backup camera before operating their vehicle, so as to enable the backup camera to operate properly and thus help avoid backup collision.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system to identify vision sensor impairment, the system including: a memory configured to include one or more executable instructions; a controller configured to execute the executable instructions; a vision sensor located on a vehicle exterior, the vision sensor configured to capture at least one image of at least a portion of an environment surrounding the vehicle; where the executable instructions enable the controller to: receive a request communicated from a mobile computing device; in response to the request, communicate an activation signal to the vision sensor, the activation signal configured to activate the vision sensor to capture at least one image of at least a portion of the environment surrounding the vehicle; receive the at least one captured image from the vision sensor; determine whether the view of the at least one captured image includes at least one substantially impairing weather debris object; and based on the determination of whether the view of the at least one captured image includes at least one substantially impairing weather debris object, generate a notification and communicate the notification to the mobile computing device. Other embodiments of this aspect include corresponding computer systems, apparatus, and computer programs recorded on one or more computer storage devices, each configured to perform the actions of the methods.

Implementations may include one or more of the following features. The system where the executable instructions further enable the controller to, in response to the request, communicate a remote start signal to the vehicle, the remote start signal configured to turn on the vehicle. The system where the vision sensor is a camera and the notification is configured to provide a warning to clear the at least one substantially impairing weather debris object off the lens of the camera. The system where the notification is further configured to be displayed via a vehicle app installed onto the mobile computing device. The system where the determination of whether the view of the at least one captured image includes at least one substantially impairing weather debris object is further based on a result from at least one object recognition technique carried out at a data center. The system where the determination of whether the view of the at least one captured image includes at least one substantially impairing weather debris object is further based on a result from at least one object recognition technique carried out at the vision sensor. The system where the memory and controller are located at a data center. Implementations of the described techniques may include hardware, a method or process, or computer software on a computer-accessible medium.

One general aspect includes a method to identify vision sensor impairment, the method including: providing a memory configured to include one or more executable instructions; providing a controller configured to execute the executable instructions; providing a vision sensor located on a vehicle exterior, the vision sensor configured to capture at least one image of at least a portion of an environment surrounding the vehicle; receiving (via the controller) a request communicated from a mobile computing device; in response to the request, communicating (via the controller) an activation signal to the vision sensor, the activation signal configured to activate the vision sensor to capture at least one image of at least a portion of the environment surrounding the vehicle; receiving (via the controller) the at least one captured image from the vision sensor; determining (via the controller) whether the view of the at least one captured image includes at least one substantially impairing weather debris object; and based on the determination step, generating and communicating (via the controller) a notification to the mobile computing device. Other embodiments of this aspect include corresponding computer systems, apparatus, and computer programs recorded on one or more computer storage devices, each configured to perform the actions of the methods.

Implementations may include one or more of the following features. The method further including, in response to the request, communicating (via the controller) a remote start signal to the vehicle, the remote start signal configured to turn on the vehicle. The method where the vision sensor is a camera and the notification is configured to provide a warning to clear the at least one substantially impairing weather debris object off the lens of the camera. The method where the notification is further configured to be displayed via a vehicle app installed onto the mobile computing device. The method where the determination of whether the view of the at least one captured image includes at least one substantially impairing weather debris object is further based on a result from at least one object recognition technique carried out at a data center. The method where the determination of whether the view of the at least one captured image includes at least one substantially impairing weather debris object is further based on a result from at least one object recognition technique carried out at the vision sensor. The method where the memory and controller are located at a data center. Implementations of the described techniques may include hardware, a method or process, or computer software on a computer-accessible medium.

One general aspect includes a non-transitory and machine-readable medium having stored thereon executable instructions adapted to identify vision sensor impairment, which when provided to a controller and executed thereby, causes the controller to: receive a request communicated from a mobile computing device; in response to the request, communicate an activation signal to a vision sensor, where the vision sensor is located on a vehicle exterior, and where the activation signal is configured to activate the vision sensor to capture at least one image of at least a portion of an environment surrounding the vehicle; receive the at least one captured image from the vision sensor; determine whether the view of the at least one captured image includes at least one substantially impairing weather debris object; based on the determination of whether the view of the at least one captured image includes at least one substantially impairing weather debris object, generate and communicate a notification to the mobile computing device. Other embodiments of this aspect include corresponding computer systems, apparatus, and computer programs recorded on one or more computer storage devices, each configured to perform the actions of the methods.

Implementations may include one or more of the following features. The non-transitory and machine-readable memory further including, in response to the request, communicate a remote start signal to the vehicle, the remote start signal configured to turn on the vehicle. The non-transitory and machine-readable memory where the vision sensor is a camera and the notification is configured to provide a warning to clear the at least one substantially impairing weather debris object off the lens of the camera. The non-transitory and machine-readable memory where the notification is further configured to be displayed via a vehicle app installed onto the mobile computing device. The non-transitory and machine-readable memory where the determination of whether the view of the at least one captured image includes at least one substantially impairing weather debris object is further based on a result of at least one object recognition technique carried out at a data center. The non-transitory and machine-readable memory where the determination of whether the view of the at least one captured image includes at least one substantially impairing weather debris object is further based on a result of at least one object recognition technique carried out at the vision sensor. Implementations of the described techniques may include hardware, a method or process, or computer software on a computer-accessible medium.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
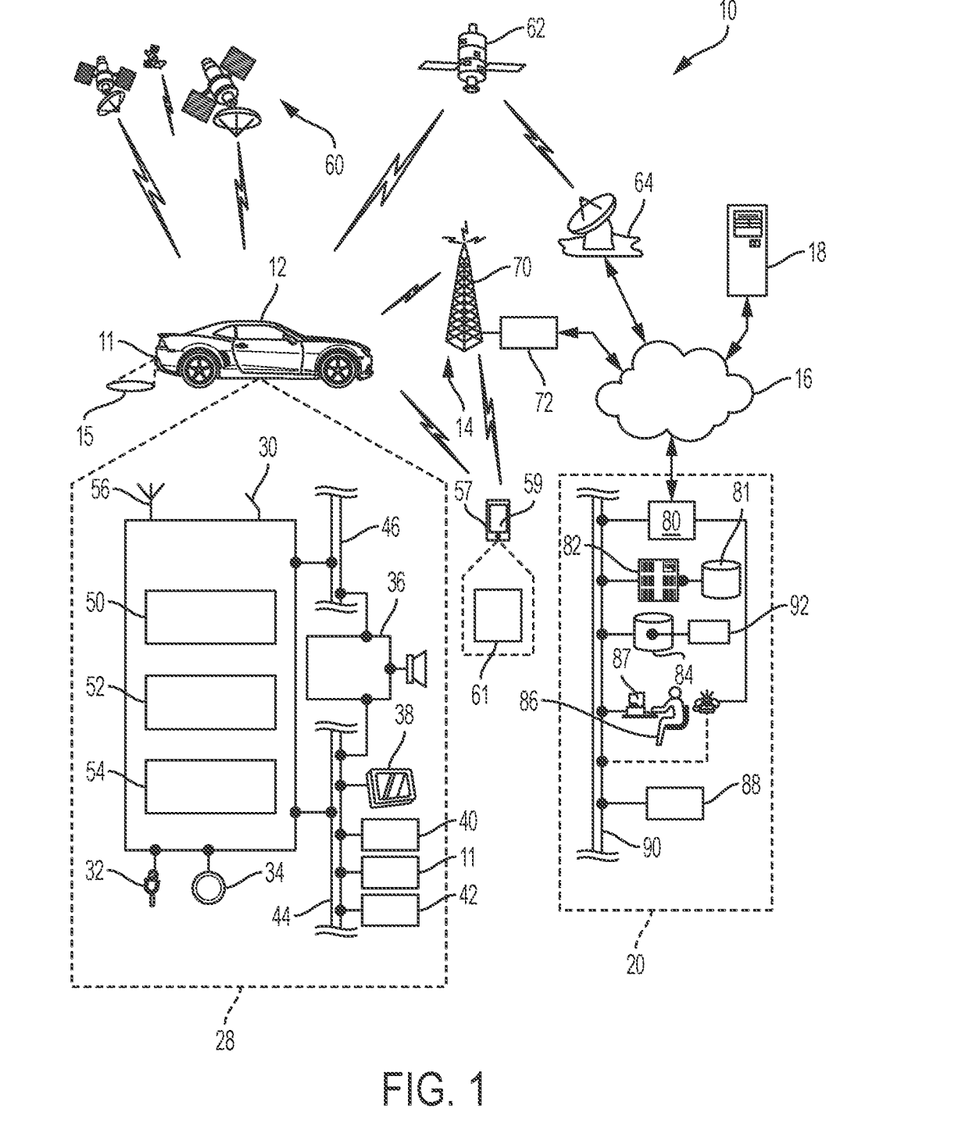
FIG. 1 is a block diagram depicting an exemplary embodiment of a communications system that is capable of utilizing the system and method disclosed herein.

With reference to FIG. 1, there is shown an operating environment that includes, among other features, a mobile vehicle communications system 10 and that can be used to implement the method disclosed herein. Communications system 10 generally includes a vehicle 12, one or more wireless carrier systems 14, a land communications network 16, a computer 18, and a data center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including, but not limited to, motorcycles, trucks, busses, sports utility vehicles (SUVs), recreational vehicles (RVs), construction vehicles (e.g., bulldozers), trains, trolleys, marine vessels (e.g., boats), aircraft, helicopters, amusement park vehicles, farm equipment, golf carts, trams, etc., can also be used. Some of the vehicle electronics 28 is shown generally in FIG. 1 and includes a telematics unit 30, a microphone 32, one or more pushbuttons or other control inputs 34, an audio system 36, a visual display 38, vision sensor 11, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), WIFI, Bluetooth and Bluetooth Low Energy, a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket transceiver device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor 86 or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to standards such as LTE or 5G and thus includes a standard cellular chipset 50 for voice communications like hands-free calling, a wireless modem for data transmission (i.e., transceiver), an electronic processing device 52, at least one digital memory device 54, and an antenna system 56. It should be appreciated that the modem can either be implemented through software that is stored in the telematics unit and is executed by processor 52, or it can be a separate hardware component located internal or external to telematics unit 30. The modem can operate using any number of different standards or protocols such as, but not limited to, WCDMA, LTE, and 5G. Wireless networking between vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a mobile computing device 57, such as a smart phone, personal laptop computer, smart wearable device, or tablet computer having two-way communication capabilities, a netbook computer, or any suitable combinations thereof. The mobile computing device 57 can include computer processing capability and memory (not shown), a transceiver capable of communicating with wireless carrier system 14, a user interface 59, and/or a GPS module capable of receiving GPS satellite signals and generating GPS coordinates based on those signals. User interface 59 may be embodied as a touch-screen graphical interface capable of user interaction as well as displaying information which may be through graphical user interfaces (GUIs). Examples of the mobile computing device 57 include the iPhone™ manufactured by Apple, Inc. and the Droid™ manufactured by Motorola, Inc. as well as others. While the mobile computing device 57 may include the ability to communicate via cellular communications using the wireless carrier system 14, this is not always the case. For instance, Apple manufactures devices such as the various models of the iPad™ and iPod Touch™ that include the processing capability, user interface 59, and the ability to communicate over a short-range wireless communication link such as, but not limited to, WIFI and Bluetooth. However, the iPod Touch™ and some iPads™ do not have cellular communication capabilities. Even so, these and other similar devices may be used or considered a type of wireless device, such as the mobile computing device 57, for the purposes of the method described herein.

Mobile device 57 may be used inside or outside of vehicle 12, and may be coupled to the vehicle by wire or wirelessly. The mobile device also may be configured to provide services according to a subscription agreement with a third-party facility or wireless/telephone service provider. It should be appreciated that various service providers may utilize the wireless carrier system 14 and that the service provider of the telematics unit 30 may not necessarily be the same as the service provider of the mobile devices 57.

When using a short-range wireless connection (SRWC) protocol (e.g., Bluetooth/Bluetooth Low Energy or Wi-Fi), mobile computing device 57 and telematics unit 30 may pair/link one with another when within a wireless range (e.g., prior to experiencing a disconnection from the wireless network). In order to pair, mobile computing device 57 and telematics unit 30 may act in a BEACON or DISCOVERABLE MODE having a general identification (ID); SRWC pairing is known to skilled artisans. The general identifier (ID) may include, e.g., the device's name, unique identifier (e.g., serial number), class, available services, and other suitable technical information. Mobile computing device 57 and telematics unit 30 may also pair via a non-beacon mode. In these instances, the call center 20 may participate in pairing mobile computing device 57 and telematics unit 30. For example, the call center 20 may initiate the inquiry procedure between the telematics unit 30 and mobile computing device 57. And call center 20 may identify mobile computing device 57 as belonging to the user of vehicle 12 and then receive from the mobile computing device 57 it's unique mobile device identifier and authorize the telematics unit 30 via the wireless communication system 14 to pair with this particular ID.

Once SRWC is established, the devices may be considered bonded as will be appreciated by skilled artisans (i.e., they may recognize one another and/or connect automatically when they are in a predetermined proximity or range of one other. In other words—they may become, at least temporarily, network participants). Call center 20 may also authorize SRWC on an individual basis before completion.

The mobile computing device 57 additionally has a vehicle-related software application 61 (e.g., RemoteLink™ by OnStar, myChevrolet™ by General Motors, etc.) resident on its memory. This vehicle app 61 may be downloaded (e.g., from an online application store or marketplace) and stored on the device's electronic memory. When the vehicle app 61 is installed on the mobile computing device 57, in one or more embodiments, the user can be presented with option to turn on a proprietary messaging service (e.g., Apple's Push Notification Services (APNS) service or Firebase Cloud Messaging (FCM) service).

In the examples disclosed herein, the vehicle app 61 enables the mobile computing device user to manage remote start attempts from mobile computing device 57. In particular, the vehicle app 61 enables the user to sign up for a remote start service and to register one or more specific vehicles 12 with the remote start service. This information may be stored in the memory of mobile computing device 57 and accessible by vehicle app 61 which may be implementing one or more GUIs via user interface 59. This information may also be transmitted from the vehicle app 61 to a remotely located mobile integration gateway 92 (discussed below) for storage in the user's account in the database 84.

The vehicle app 61 also allows the user to initiate a remote start attempt from the mobile computing device 57. Upon receiving a user input indicating that the user would like to initiate a remote start, the vehicle app 61 generates a remote start attempt message to send to the mobile integration gateway 92 (discussed below). In some examples, the vehicle app 61 is programmed to know which vehicle identifier to include with the remote start attempt message because the user has registered his/her vehicle(s) 12 with remote start service. The vehicle app 61 may also allow the user to initiate a lens cleanliness attempt (discussed below) or this attempt may be initiated automatically with the remote start attempt. The initiated lens cleanliness attempt may cause the vehicle app 61 to generate a lens cleanliness attempt message to send to the mobile integration gateway 92 (discussed below).

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54, which enable the telematics unit to provide a wide variety of services. For instance, controller 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services provided in connection with one or more vehicle system modules 42 (VSM); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system, such as computer 18, for other purposes, such as fleet management. Also, new or updated map data can be downloaded to the GPS module 40 from the data center 20 via the telematics unit 30.

Apart from the audio system 36 and GPS module 40, the vehicle 12 can include other VSMs 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests.

As examples, one VSM 42 can be an engine control module (ECM) that controls various aspects of engine operation such as fuel ignition and ignition timing, another VSM 42 can be a powertrain control module (PCM) that regulates operation of one or more components of the vehicle powertrain, and another VSM 42 can be a body control module (BCM) that governs various electrical components located throughout the vehicle, like the vehicle's power door locks and headlights. According to one embodiment, the ECM 42 is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM, media streaming services (e.g., PANDORA RADIO™, SPOTIFY™, etc.), satellite radio, CD, DVD, and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions (i.e., capable of GUI implementation). Audio system 36 may also generate at least one audio notification to announce such third-party contact information is being exhibited on display 38 and/or may generate an audio notification which independently announces the third-party contact information. Various other vehicle user interfaces can also be utilized, as the interfaces of FIG. 1 are only an example of one particular implementation.

Figure 3:
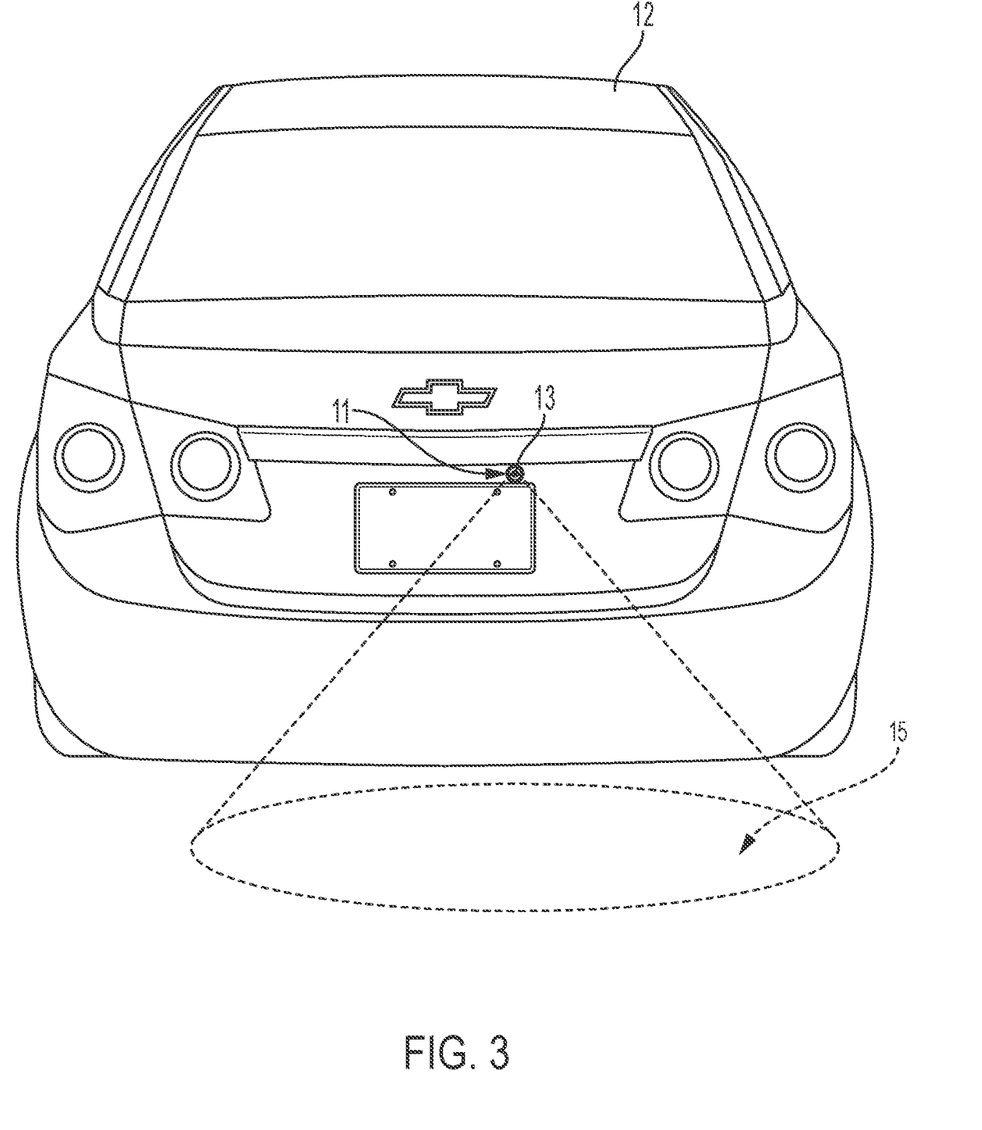
FIG. 3 is a perspective view of the backside of a vehicle illustrating aspects of the system and method disclosed herein.

Vison sensor 11 can be any type of sensor that obtains visual information concerning an area within or surrounding vehicle 12. For example, vision sensor 11 can be a camera (e.g., a vehicle backup camera) or the sensor 11 may be some other sensor to assist in vehicle reversal such as, for example, lidar, sonar, ultrasonic, and electromagnetic sensors. The data obtained by the vision sensor 11 may also be sent to another vehicle component such as telematics unit 30, antenna 56, and/or BCM 42 via communications bus 44. In one embodiment, vision sensor 11 includes an electronic digital camera powered by the vehicle's battery (not shown). The electronic digital camera may include a memory device and a processing device to store and/or process data that it captures or otherwise obtains, and can be any suitable camera type (e.g., charge coupled device (CCD), complimentary metal oxide semiconductor (CMOS), etc.) with any suitable lens 13 (FIG. 3).

In one embodiment, vision sensor 11 can be used to capture photographs, videos, and/or other information pertaining to light, which is collectively referred to herein as vision data. In one embodiment, the vision data can be image data, which is vision data that can be represented in a pixel array and can be captured using interlacing or progressive scanning techniques. The image data can be captured at a set or preconfigured scanning or sampling frequency, and may be configured to obtain image data of a particular resolution. Once the image data is obtained through vision sensor 11, the vision data (or image data) can be processed and then sent to one or more other vehicle components, including telematics unit 30, and/or antenna 56, and/or BCM 42. Vision sensor 11 can include processing capabilities via its embedded processor and which enable image processing techniques, including object recognition techniques, to be carried out at the vision sensor 11. In one or more other embodiments, the vision sensor 11 may send raw or formatted image data to another vehicle component, such as telematics unit 30 (i.e., electronic processing device 52) or another central vehicle computer, which can then perform the image processing techniques and object recognition techniques. In one or more alternative embodiments, vision sensor 11 may send raw or formatted image data to a remote location (via antenna 56) such as data center 20 or computer 18, which can then perform the image processing techniques and object recognition techniques.

The object recognition techniques (otherwise considered image recognition techniques) can be one or more (or some combination thereof) generally known processes such as, but not limited to, cascading classifier techniques, Maximally Stable Extremal Region (MSER) techniques, and Optical Character Recognition (OCR) techniques to support object identification, and may be established via software on a memory. During processing, the object recognition techniques may also correspond with an image database, having examples of objects (e.g., pictures of aspects weather in the vehicle environment, for example, snow, slush, precipitation, or winter mix, or pictures of objects in the environment, for example, vehicles, houses, or foliage, etc.), for the purposes of matching one or more visual-data-identified objects. Skilled artists will see that each of these object recognition techniques can be used sequentially to identify whether one or more objects exist in the visual data. For example, an object recognition algorithm may conduct a cascading classifier module, prior to an MSER module, which are both prior to an OCR module, all while communicating with an image database to assist with the carrying out of one or more of these modules.

Wireless carrier system 14 is preferably a cellular telephone system that includes a plurality of cell towers 70 (only one shown), one or more cellular network infrastructures (CNI) 72, as well as any other networking components required to connect wireless carrier system 14 with land network 16. Each cell tower 70 includes sending and receiving antennas and a base station, with the base stations from different cell towers being connected to the CNI 72 either directly or via intermediary equipment such as a base station controller. Cellular system 14 can implement any suitable communications technology, including for example, analog technologies such as AMPS, or the newer digital technologies such as, but not limited to, 4G LTE and 5G. As will be appreciated by skilled artisans, various cell tower/base station/CNI arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data center 20. For example, land network 16 may include a public switched telephone network (PSTN) such as that used to provide hardwired telephony, packet-switched data communications, and the Internet infrastructure (i.e., a network of interconnected computing device nodes). One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer (e.g., a SIP Presence server) where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or data center 20, or both. A computer 18 can also be used for providing Internet connectivity such as DNS services or as a network address server that uses DHCP or other suitable protocol to assign an IP address to the vehicle 12.

Data center 20 is designed to provide the vehicle electronics 28 with a number of different system backend functions and, according to the exemplary embodiment shown here, generally includes one or more switches 80, servers 82, databases 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live advisor 86 by regular phone, backend computer 87, or to the automated voice response system 88 using VoIP. Server 82 can incorporate a data controller 81 which essentially controls the operations of server 82. Server 82 may control data information as well as act as a transceiver to send and/or receive the data information (i.e., data transmissions) from one or more of the databases 84, telematics unit 30, and mobile computing device 57.

Controller 81 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 is implemented via a modem (i.e., a transceiver), connected between the land communications network 16 and local area network 90.

Data transmissions are passed via the modem to server 82 and/or database 84. Database 84 can store account information such as vehicle dynamics information and other pertinent subscriber information. Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

Database 84 could also be designed to store information in the form of executable instructions such as, but not limited to, numerous application program interface (API) suites accessed, executed, and/or governed by server 82. Moreover, in certain embodiments, these API suites may be accessible to the system user, data center 20, or one or more third parties. As examples, one API suite can be the mobile integration gateway (MIG) 92. In some instances, MIG 92 is a gateway that facilitates the servicing of requests from the vehicle app 61 stored on the mobile computing device 57. For example, the MIG 92 may be a node that is equipped for interfacing with the mobile computing device 57 and its messaging service (which may be part of a different network).

MIG 92 can also be equipped to execute service requests from the vehicle-related application 61. For example, MIG 92 can facilitate the detection of a vehicle remote start attempt and/or lens cleanliness attempt initiated by the remote mobile computing device 57. In response, MIG 92 can construct custom message(s) that is/are to be transmitted to the mobile computing device 57 to keep a user of the device 57 apprised of the status of the remote start attempt and/or whether the lens of vision sensor 11 should be cleaned. Also in response to receiving the remote start attempt request and/or lens cleanliness attempt request, the MIG 92 facilitates the transmission of the one or more activation signals to the telematics unit 30 (e.g., a remote start signal, lens cleanliness signal, etc.). Once received at the telematics unit 30, the telematics unit 30 may send a corresponding signal that triggers BCM 42 (or another appropriate VSM) to turn the vehicle on (e.g., start ignition, power up, etc.). In addition, the telematics unit 30 may send a separate corresponding signal that triggers BCM 42 (or another appropriate VSM) to activate vision sensor 11 to take one or more images of the vehicle environment (which may also activate vision sensor 11 to conduct one or more image processing techniques).

Upon the vehicle turning on or failing to turn on, telematics unit 30 will transmit a message to the MIG 92 indicating that the vehicle 12 has successfully been started or has failed to start. The MIG 92 in turn generates a success/failure notification to be sent to the mobile computing device 57. This message may be a pop-up or push notification that informs the user of the mobile computing device 57 that vehicle 12 has been started or has failed to start.

Moreover, upon vision sensor 11 capturing, for example, one or more photographs, telematics unit 30 will also transmit the vision data to MIG 92. The MIG 92 can in turn conduct image processing techniques to evaluate the whether a substantial amount of weather debris exists on the lens of vision sensor 11 or, in the alternative, analyzes the results of image processing techniques conducted by vision sensor 11/telematics unit 30. Moreover, when the outcome of such image processing techniques shows that a substantial amount of weather debris exists on the lens of vision sensor 11, MIG 92 generates a cleaning warning notification to be sent to the mobile computing device 57. As such, when generated and sent, this warning may be a pop-up or push notification adapted to inform the user of the mobile computing device 57 cleaning of the lens of vision sensor 11 should occur prior to vehicle operation. As mentioned above, it should be understood that the lens cleanliness attempt may be initiated automatically with a vehicle remote start attempt or the lens cleanliness attempt may be independently initiated by the mobile computing device 57. It should also be understood that the image processing techniques (e.g., object recognition techniques) may otherwise occur at the vision sensor 11 or at a remote location (e.g., computer 18).

Method

Figure 2:
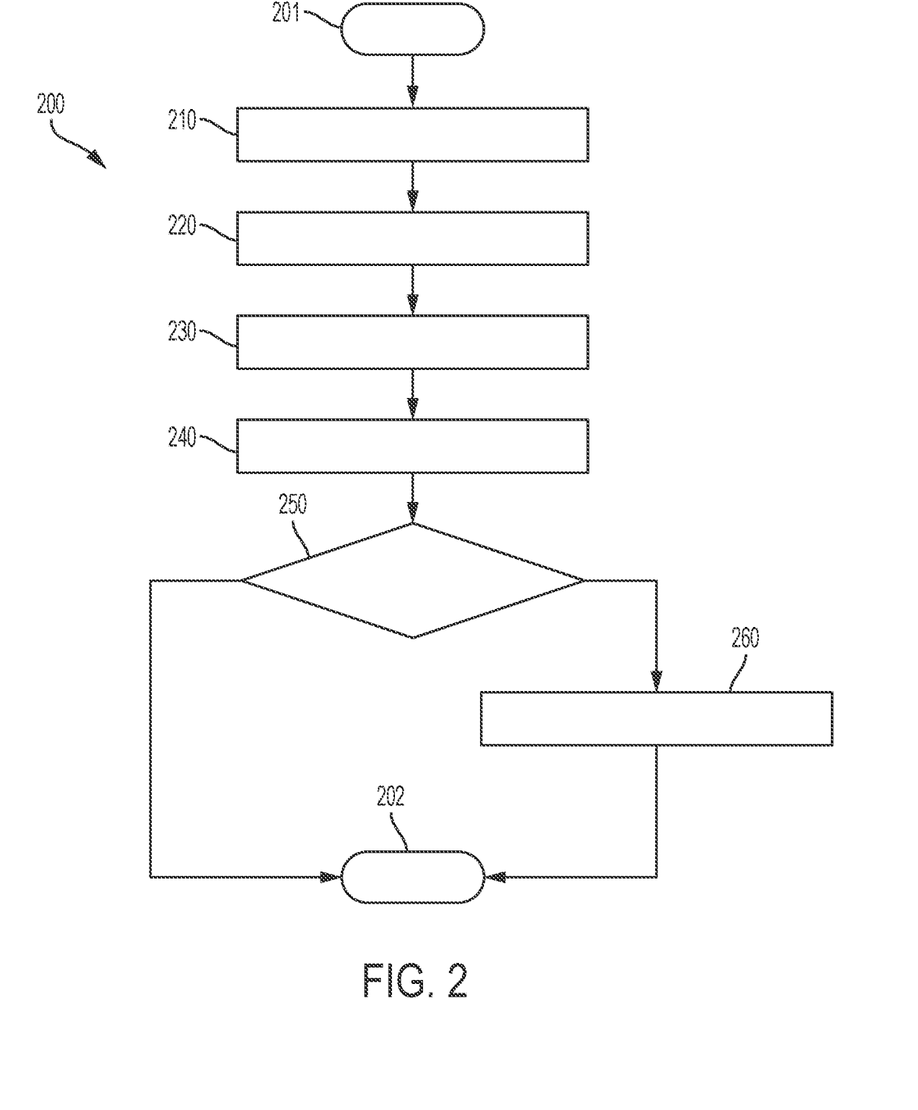
FIG. 2 is a flow chart for an exemplary methodology for identifying backup camera vision impairment.

Now turning to FIG. 2, there is shown an embodiment of a method 200 to identify sensing issues of a vision sensor 11 for vehicle 12. One or more aspects of identification method 200 may be completed through MIG 92 being implemented by server 82 of data center 20 which may include one or more executable instructions incorporated into data base 81. One or more aspects of method 200 may otherwise, for example, be completed through vehicle telematics unit 30, vision sensor 11, and mobile computing device 57 (which may include vehicle app 61). Skilled artisans will moreover see that telematics unit 30, data center 20, vision sensor 11, and mobile computing device 57 may be remotely located from each other.

Method 200 is supported by telematics unit 30 being configured to establish vehicle-internal communications with vision sensor 11 and data center 20. This configuration may be established by a vehicle manufacturer at or around the time of the telematics unit's assembly or aftermarket (e.g., via vehicle download using the afore-described communication system 10 or at a time of vehicle service, just to name a couple of examples). In at least one implementation, one or more instructions are provided to the telematics unit 30 and stored on non-transitory computer-readable medium (e.g., memory device 54). Method 200 is further supported by preconfiguring data center 20 to store the MIG 92 as well as one or more other APIs in database 84, each of which being operatively accessible via server 82. Method 200 is further yet supported by preconfiguring mobile computing device 57 to store the vehicle app 61 as well as one or more other software applications in its electronic memory as well as being preconfigured to receive one or more prompts for user input via user interface 59.

Method 200 begins at 201 with a user activating and operating vehicle app 61 on their mobile computing device 57. In step 210, the user initiates the remote start attempt request and/or the lens cleanliness attempt request from mobile computing device 57. Moreover, in this step, the lens cleanliness attempt may be made automatically with the remote start attempt (i.e., as a non-disclosed aspect of the remote start attempt), made with some other type of attempt request (e.g., lock/unlock attempt request or horn and lights attempt request), or the lens cleanliness attempt may be made by the user as an independent attempt separate from the remote start attempt. It should also be understood that one or both of these attempts may be made through user interface 59 and via one or more GUIs of vehicle app 61.

In step 220, the remote start attempt request and/or the lens cleanliness attempt request is received at and processed by MIG 92 via server 82. In step 230, MIG 92 produces and sends an activation signal to telematics unit 30. With additional reference to FIG. 3, the activation signal may be configured to cause telematics unit 30 to send a corresponding signal that triggers BCM 42 (or another appropriate VSM) to activate the vehicle's backup camera 11 (i.e., vision sensor) to take one or more images of the area behind the vehicle 15 (i.e., at least a portion of the environment surrounding vehicle). Depending on whether the remote start attempt request has been made in conjunction with the lens cleanliness attempt request, in one or more embodiments, telematics unit 30 may also send a separate corresponding signal that triggers BCM 42 to turn on one or more of the systems of the vehicle 12.

Figure 4:
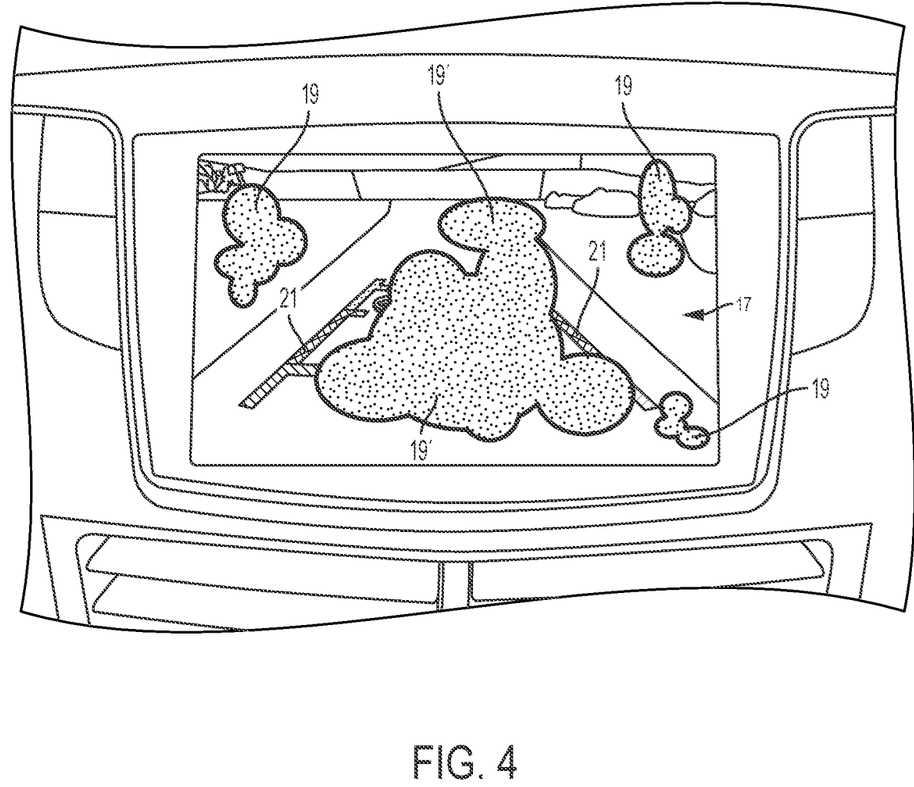
FIG. 4 is a perspective view of an image of the area behind the vehicle illustrating aspects of the system and method disclosed herein.

With additional reference to FIG. 4, in step 240, backup camera 11 captures at least one image 17 of the area behind the vehicle 15. Backup cameras 11 are generally known to capture images/recordings of the area behind the vehicle 15 to assist a vehicle's operator when driving their vehicle 12 in reverse (e.g., when backing out of a parking spot).

In step 250, at least one object recognition technique is carried out to recognize if an impairing amount of weather debris 19 is found in the vehicle-environment view presented by image 17 and thus if an impairing amount of weather debris has covered camera lens 13 (see FIG. 3). For example, the object recognition techniques can recognize objects 19 such as precipitation (e.g., rain, snow, sleet, hail, etc.), road salt, and dirt, or some combination thereof, that has found its way onto the lens 13 and created blurriness, fogginess, or some other substantial impairment of the image view 17. The object recognition techniques may also recognize the location of the objects 19 in the vehicle-environment view of image 17.

As can be understood, a substantial impairment of image 17 will be such that the image 17 ceases to operatively assist the vehicle operator while attempting to drive their vehicle 12 in reverse. For example, skilled artisans will understand that when, for example, at least 20% of the vehicle-environment view of image 17 has been blocked, the weather debris objects will have substantially impaired the image 17. Skilled artisans will also understand that a substantial impairment may occur when a weather debris object is located at a pivotal location in the vehicle-environment view of image 17. For example, if one or more of the steering predictor overlay lines 21 (or the locations between these lines) in the vehicle-environment view have been blocked, the weather debris objects will have substantially impaired the image 17 (see object 19'). Upon completion of the object recognition technique(s) a result may be produced—this result may be binary in nature (i.e., 1=a substantial impairing amount of whether debris objects exist; 0=no impairment) or as a confidence level (e.g., confidence levels above 50%=a substantial impairing amount of whether debris objects exist; less than 50%=no impairment).

As discussed above, the object recognition technique(s) can be carried out at the backup camera 11 or telematics unit 30. In such embodiments, the result may be transmitted to MIG 92 at data center 20 via telematics unit 30. The object recognition technique(s) can otherwise be installed onto MIG 92 and carried out by the API at data center 20. In these embodiments, the image captured by backup camera 11 is sent as vision data to data center 20 via telematics unit 30.

Moreover, in this step, MIG 92 analyzes the results of the object recognition technique(s). If the results of the object recognition technique(s) reflect that an impairing amount of weather debris 19 exists in the vehicle-environment view, then method 200 will move to step 260; otherwise method 200 will move to completion 202.

Figure 5:
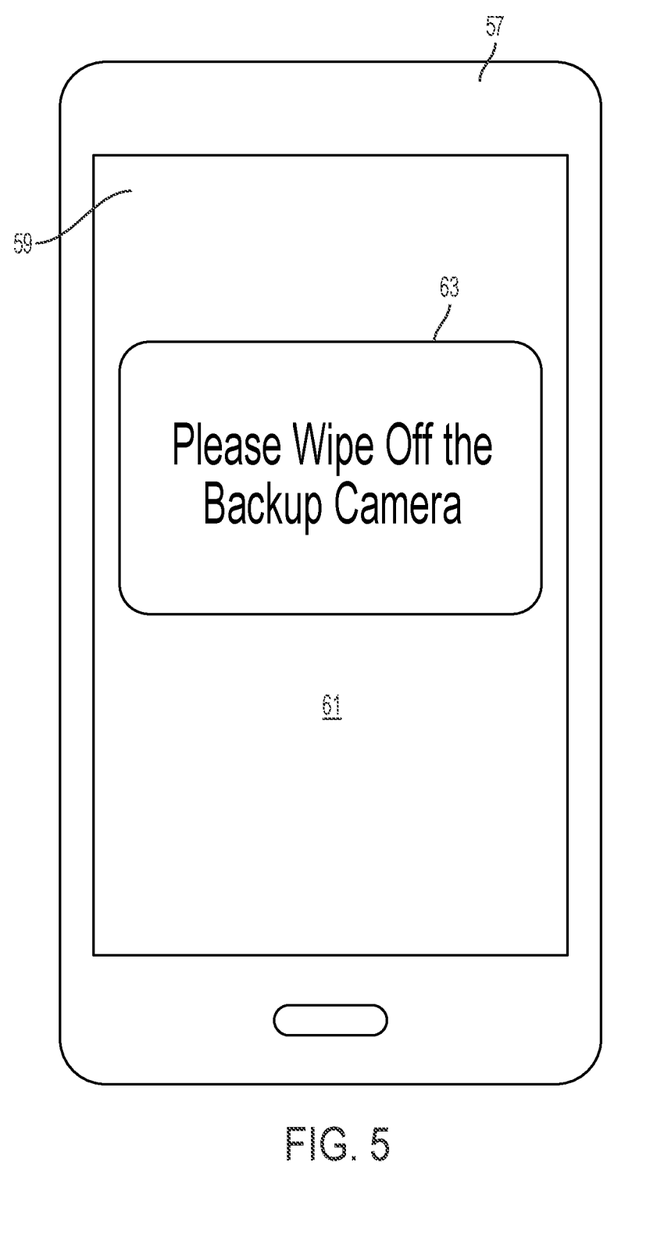
FIG. 5 is a plan view of a backup camera impairment notification illustrating aspects of the system and method disclosed herein.

With additional reference to FIG. 5, in step 260, MIG 92 will generate a notification 63 that can be displayed on the vehicle app 61 via user interface 59. Once generated, MIG 92 will transmit the notification to mobile computing device 57. As shown, the notification 63 is configured to provide a warning for the user of mobile computing device 57 to clean the lens 13 of backup camera 11 so as to remove at least part of the recognized weather debris objects. As such, this notification will act as a reminder that the view of the images/recordings of backup camera 11 will not adequately assist the vehicle driver to operate their vehicle in reverse. This notification may be a pop-up or push notification. After step 260, method 200 will move to completion 202.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A system to identify backup camera impairment, the system comprising:
   a memory configured to comprise one or more executable instructions;
   a controller configured to execute the executable instructions;
   a backup camera located on a rear end of a vehicle exterior, the backup camera configured to capture at least one image of at least a portion of an area behind a vehicle; and
   wherein the executable instructions enable the controller to:
      receive a request communicated from a mobile computing device;
      in response to the request, communicate an activation signal to the backup camera, the activation signal configured to activate the backup camera to capture at least one image of at least a portion of an area behind the vehicle upon the vehicle being turned on and before the vehicle begins to move;
      receive the at least one captured image from the backup camera;
      determine whether the view of the at least one captured image comprises an impairing amount of weather debris that has covered the lens of the backup camera such that the at least one captured image cannot operatively assist a user while attempting to operate the vehicle in reverse; and
      based on the determination of whether the view of the at least one captured image comprises at least one substantially impairing debris object, generate a notification and communicate the notification to the mobile computing device, wherein the notification is configured to provide a warning for the user to manually clean the lens of the backup camera such that the user should substantially remove the weather debris from the lens.

2. The system of claim 1, wherein the executable instructions further enable the controller to, in response to the request, communicate a remote start signal to the vehicle, the remote start signal configured to turn on the vehicle.

3. The system of claim 1, wherein the notification is further configured to be displayed via a vehicle app installed onto the mobile computing device.

4. The system of claim 1, wherein the determination of whether the view of the at least one captured image comprises at least one substantially impairing debris object is further based on a result from at least one object recognition technique carried out at a data center.

5. The system of claim 1, wherein the determination of whether the view of the at least one captured image comprises at least one substantially impairing debris object is further based on a result from at least one object recognition technique carried out at the backup camera.

6. The system of claim 1, wherein the memory and controller are located at a data center.

7. A method to identify backup camera impairment, the method comprising:
   providing a memory configured to comprise one or more executable instructions;
   providing a controller configured to execute the executable instructions;
   providing a backup camera located on a rear end of a vehicle exterior, the backup camera configured to capture at least one image of at least a portion of an area behind a vehicle;
   receiving (via the controller) a request communicated from a mobile computing device;
   in response to the request, communicating (via the controller) an activation signal to the backup camera, the activation signal configured to activate the backup camera to capture at least one image of at least a portion of an area behind the vehicle upon the vehicle being turned on and before the vehicle begins to move;
   receiving (via the controller) the at least one captured image from the backup camera;
   determining (via the controller) whether the view of the at least one captured image comprises an impairing amount of weather debris that has covered the lens of the backup camera such that the at least one captured image cannot operatively assist a user while attempting to operate the vehicle in reverse; and based on the determination step, generating and communicating (via the controller) a notification to the mobile computing device, wherein the notification is configured to provide a warning for the user to manually clean the lens of the backup camera such that the user should substantially remove the weather debris from the lens.

8. The method of claim 7, further comprising, in response to the request, communicating (via the controller) a remote start signal to the vehicle, the remote start signal configured to turn on the vehicle.

9. The method of claim 7, wherein the notification is further configured to be displayed via a vehicle app installed onto the mobile computing device.

10. The method of claim 7, wherein the determination of whether the view of the at least one captured image comprises at least one substantially impairing weather debris object is further based on a result from at least one object recognition technique carried out at a data center.

11. The method of claim 7, wherein the determination of whether the view of the at least one captured image comprises at least one substantially impairing weather debris object is further based on a result from at least one object recognition technique carried out at the backup camera.

12. The method of claim 7, wherein the memory and controller are located at a data center.

13. A non-transitory and machine-readable medium having stored thereon executable instructions adapted to identify backup camera impairment, which when provided to a controller and executed thereby, causes the controller to:
receive a request communicated from a mobile computing device;
in response to the request, communicate an activation signal to a backup camera, wherein the backup camera located on a rear end of a vehicle exterior, and wherein the activation signal configured to activate the backup camera to capture at least one image of at least a portion of an area behind the vehicle upon the vehicle being turned on and before the vehicle begins to move;
receive the at least one captured image from the backup camera;
determine whether the view of the at least one captured image comprises an impairing amount of weather debris that has covered the lens of the backup camera such that the at least one captured image cannot operatively assist a user while attempting to operate the vehicle in reverse; and
based on the determination of whether the view of the at least one captured image comprises the impairing amount of weather debris, generate and communicate a notification to the mobile computing device, wherein the notification is configured to provide a warning for the user to manually clean the lens of the backup camera such that the user should substantially remove the weather debris from the lens.

14. The non-transitory and machine-readable memory of claim 13, further comprising, in response to the request, communicate a remote start signal to the vehicle, the remote start signal configured to turn on the vehicle.

15. The non-transitory and machine-readable memory of claim 13, wherein the notification is further configured to be displayed via a vehicle app installed onto the mobile computing device.

16. The non-transitory and machine-readable memory of claim 13, wherein the determination of whether the view of the at least one captured image comprises at least one substantially impairing weather debris object is further based on a result of at least one object recognition technique carried out at a data center.

17. The non-transitory and machine-readable memory of claim 13, wherein the determination of whether the view of the at least one captured image comprises at least one substantially impairing weather debris object is further based on a result of at least one object recognition technique carried out at the backup camera.

* * * * *